UNITED STATES PATENT OFFICE.

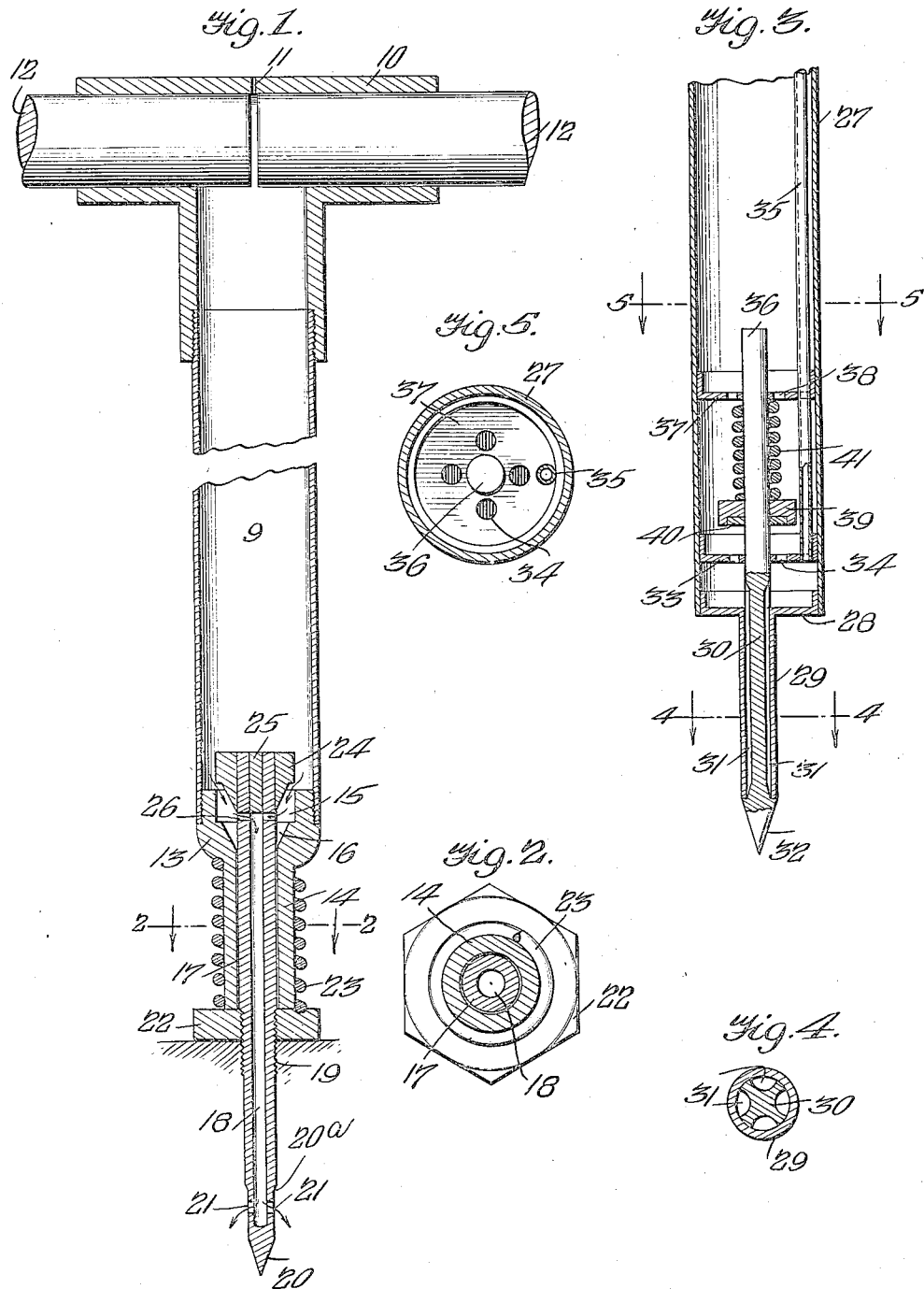

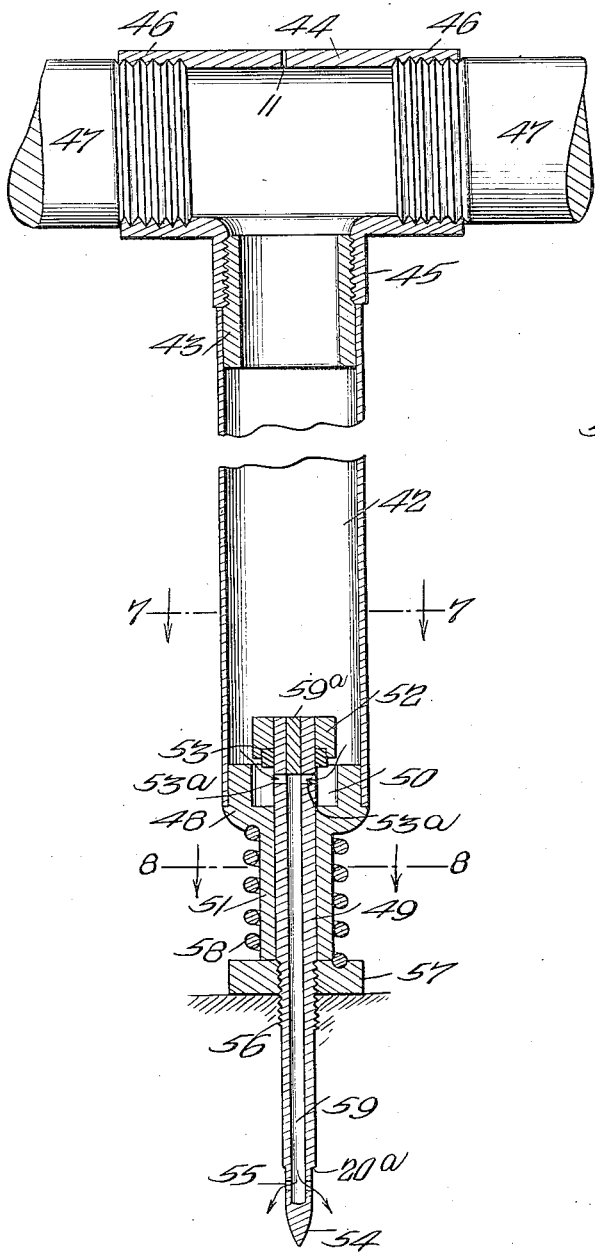
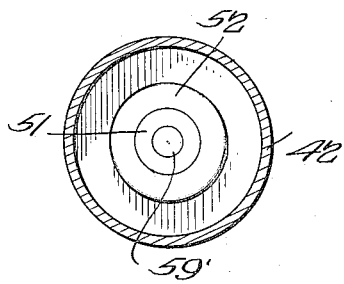
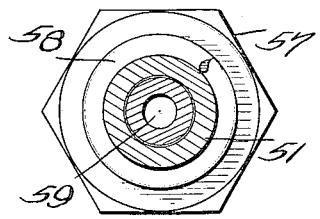

CLAYTON O. BLANDIN, WILLIAM T. DAVIS, AND WILLIAM A. REYNOLDS, OF DENVER, COLORADO.

WEED-DESTROYER.

1,110,182.  Specification of Letters Patent.  Patented Sept. 8, 1914.

Application filed August 27, 1913. Serial No. 786,936.

*To all whom it may concern:*

Be it known that we, CLAYTON O. BLANDIN, WILLIAM T. DAVIS, and WILLIAM A. REYNOLDS, citizens of the United States, and residents of Denver, in the county of Denver and State of Colorado, have made certain new and useful Improvements in Weed-Destroyers, of which the following is a specification.

Our invention relates to weed destroyers of the kind in which a liquid poison or other destructive liquid or material is applied to the roots of the weeds. More particularly stated, we seek to provide a device of this character whereby a measured charge of the destructive liquid is applied locally to the roots of the weeds in order to destroy the weeds without danger to the neighboring grass or other vegetation.

Reference is made to the accompanying drawings forming a part of this specification and in which like letters indicate like parts.

Figure 1 is a vertical section through one form of our invention, in which the destructive liquid is discharged through a nozzle having a central axial passage. Fig. 2 is a horizontal section through the same, on the line 2—2 of Fig. 1. Fig. 3 is a vertical section through a modified form of the invention, in which the discharge of the liquid is caused in a different way. Fig. 4 is a horizontal section on the line 4—4 of Fig. 3, looking in the direction of the arrows. Fig. 5 is a horizontal section on the line 5—5 of Fig. 3, looking in the direction of the arrows. Fig. 6 is a fragmentary vertical section through a form of our invention differing slightly from the form shown in Fig. 1. Fig. 7 is a horizontal section on the line 7—7 of Fig. 6, looking in the direction of the arrow. Fig. 8 is a horizontal section on the line 8—8 of Fig. 6, looking in the direction of the arrow.

A barrel 9, having generally the form of a cylinder, is threaded at its upper end, which is fitted into a T 10. This T is provided with a hole 11, serving as an air vent, as hereinafter described. Two arms 12 are fitted into the T, and therewith constitute a handle. Mounted upon the lower end of the barrel 9 is a sleeve 13, preferably formed by casting, and threaded to fit within the adjacent end of the barrel 9, the latter being threaded internally for the purpose. The sleeve 13 is provided with a smooth cylindrical portion 14 and with a compartment 15, the latter having a conical portion 16 which merges into the bore of the cylindrical portion 14 of the sleeve. Slidably mounted within the bore of the cylindrical portion 14 is a tubular needle 17 provided with a longitudinal axial passage 18 and with a threaded portion 19. The tubular needle 17 is further provided with a point 20 which in this instance has a substantially conical form. The tubular needle is also provided with discharge openings 21, which merge into the passage 18. The tubular needle is further provided with an annular shoulder 20ª, the diameter being slightly reduced below this shoulder, as may be understood from Fig. 1.

A revoluble nut 22 is threaded internally and fitted upon the threaded portion 19. A spiral spring 23 encircles the smooth cylindrical portion 14 of the sleeve 13 and engages the nut 22, as well as the upper enlarged body portion of the sleeve 13. The needle 17 at its upper end carries a piston 24 of suitable form to fit tightly into the compartment 15, the lower portion of the piston being slightly conical in order to fit into the conical portion 16 of the compartment 15.

A plug 25 closes the upper end of the needle. The upper part of the needle is provided with holes 26 merging into the passage 18. A destructive liquid, such as gasolene or a solution of sulphate of iron, is placed within the barrel 9. For this purpose the T 10 may be removed from the barrel or one of the arms 12 may be removed from the T 10, as desired. The tension of the spring 23 normally maintains the nut 22 out of engagement with the adjacent end of the cylindrical portion 14 of the sleeve 13. As a consequence, the piston 24 normally rests within the compartment 15.

The operation of the device shown in Fig. 1 is as follows: The operator grasps the handle and thrusts the point 20 into the ground, the point being so directed as to pierce the root of the weed to be destroyed. The point 20 in entering the ground offers more or less resistance and consequently the pressure upon the handle has more or less tendency to compress the spring 23. If the ground happens to be soft, the spring may not be compressed until the nut 22 arrives in contact with the ground. When this occurs, however, the pressure upon the handle causes the spring 23 to be compressed. The needle 17 is thus forced backwardly with regard to the thrust of the barrel 9, and assumes consequently the position indicated in Fig. 1. The destructive liquid contained in the barrel 9 now flows downwardly into the compartment 15 and through the holes 26 and axial passage 18. The liquid is for the moment unable to make its escape through the holes 21 owing to the fact that the lower end of the needle is tight in the ground and in the root of the weed. The operator next pulls upwardly upon the handle. In doing this the needle, by its tendency to remain sticking in the ground and in the root of the weed, is drawn outwardly to its full extent, the spring 23 facilitating this purpose. This causes the piston 24 to enter the compartment 15 and exert a positive pressure upon the charge of the liquid contained within the compartment 15. Most of the charge is thus expelled through the passage 18 and openings 21, and placed directly into the root of the weed or in close proximity to the same. As the needle 17 is being withdrawn from the ground, the liquid readily makes its escape through the holes 21, because of the reduced diameter of the needle at this point. The pressure of the piston 24 upon the charge of liquid below it expels this charge forcibly after the manner of a force pump.

In the form shown in Figs. 3, 4 and 5, the barrel appears at 27, the lower end of the barrel carrying a nozzle 29 having a disk like portion 28 secured rigidly within the lower end of the barrel. The needle is shown at 30 and is provided with a plurality of channels 31 parallel with its axis. The lower end of the needle is provided with a conical head 32 against which the nozzle 29 fits tightly so as to form a fluid-tight joint.

A partition 33 is mounted rigidly within the barrel 27 and is provided with openings 34. The needle 30 extends axially through this partition and is movable relatively to the same. The partition 37 is located above the partition 34 and is provided with holes 38. This partition being stationary, the needle 30 is slidable relatively to it. The upper portion 36 of the needle is smooth and cylindrical so as to move freely through the two partitions. Connected with the partition 33 and extending through the same is a tube 35 which is used as an air vent in instances when gravity is depended upon to cause the liquid to pass downwardly from the chamber below the partition 33. In some instances we connect the upper end of the tube 35 to a rubber bulb, controllable by hand for the purpose of introducing air pressure below the partition 33, in order to expel the charge of liquid.

Mounted rigidly upon the cylindrical portion 36 of the needle 30 is a valve 39 carrying a packing 40. A spiral spring 41 encircles the smooth portion 36 of the needle and also engages the partition 37 and the valve 39. The tendency of the spring 41 is to force the valve 39 downwardly so that the packing 40 closes the openings 34.

The barrel 27 having the general form of a cylinder, is adapted to contain a destructive liquid above mentioned. As the point 32 and nozzle 29 are thrust into the soil, the needle 30 is forced upwardly so as to form a fluid-tight joint at the bottom of the nozzle 29.

A charge of liquid now descends through the holes 34 and fills the space beneath the partition 33. As soon as the handle of the device is relaxed, the pressure of the spring 41 causes the barrel to rise, so that the valve 39 now closes the holes 34 and prevents the inflow of more liquid. If now, gravity alone be depended upon to expel the charge of liquid thus measured off, the tube 35 acts as a vent for the purpose of admitting air. If the tube 35 is connected with a bulb as above explained, the bulb is squeezed by hand and air pressure is thus applied to the charge of liquid, to expel the same.

In the form shown in Fig. 6, the barrel appears at 42 and connected with its upper end is a cylinder 43, the upper outer portion of which is threaded. A T 44 is provided with a neck 45 threaded internally to fit upon this portion. The T 44 is further provided with end portions 46 which are threaded internally and fitted with arms 47, these parts together constituting a handle. A sleeve 48 is secured upon the lower end of the barrel 42. A needle 49 having a form somewhat similar to that of the needle 17 above described; extends through the sleeve 48. This sleeve is provided with a compartment 50 and with a smooth cylindrical portion 51. The needle 49 carries a piston 52 and a packing 53. The needle is further provided with openings 53ª which communicate with the compartment 50. The lower end of the needle is provided with a conical point 54 and with openings 55 just above this point. The needle is further provided with a threaded portion 56 and fitted upon the latter is a nut 57. A spiral spring 58 engages this nut and encircles the cylindrical portion 51 of the sleeve 48. The axial bore of the needle 49 is shown at 59 and merges into the openings 55 and 53ª. A plug 59ª closes the upper end of this bore as may be understood from Fig. 6.

The construction shown in Fig. 6 is very much like that appearing in Fig. 1. The cylinder 43 facilitates the removal of the handle 44 and the packing 53 serves to render the device more closely fluid tight. The operation of the device shown in Fig. 6 is not materially different from that of the form appearing in Fig. 1.

We do not limit ourselves to the particular forms shown, as variations may be made therein without departing from the spirit of our invention.

We claim:

1. A device of the character described comprising a barrel, a sleeve carried thereby and provided with a compartment and with a cylindrical portion, a hollow needle extending through said cylindrical portion, a piston carried by said needle and adapted to fit into said compartment for the purpose of forcing a destructive liquid therefrom, said needle being provided with openings through which said liquid is discharged, and means for actuating said piston so as to forcibly expel a charge of said liquid.

2. A device of the character described comprising a barrel for holding a destructive liquid, a T mounted upon said barrel and provided with a vent, arms connected with said T to facilitate handling the device, a sleeve mounted upon said barrel and provided with a cylindrical portion and with a compartment, a hollow needle extending through said cylindrical portion of said sleeve, a piston carried by said needle and adapted to fit into said compartment, said needle being provided with holes communicating with said compartment and further provided with discharge openings, a nut fitted upon said needle, and a spring engaging said nut and said sleeve for the purpose of forcibly actuating said piston relatively to said sleeve.

3. A device of the character described, comprising a barrel, a T detachably secured to the barrel and having a vent, arms secured to the T, a sleeve mounted upon the barrel and having the upper end of its bore enlarged to form a chamber, a hollow needle in the sleeve and extending through the same, said needle having a conical point and provided with lateral openings at its upper end communicating with the chamber and at its lower end with discharge openings adjacent the point, the needle being externally threaded intermediate of its ends, a nut on the threaded portion of the needle, and a spring surrounding the sleeve between a shoulder thereon and the nut.

4. A device of the character described, comprising a barrel provided with a handle and having a reduced lower end and a chamber at the junction of the said reduced end with body of the barrel, a hollow needle extending through the reduced lower end of the barrel and having apertures adjacent its ends, a piston on the upper end of the needle and adapted to enter the said chamber, an enlargement on the needle below the reduced end of the barrel, and a spring between the enlargement of the needle and the shoulder formed by the reduced portion of the barrel.

5. In a device of the character described, a barrel for holding a liquid, provided with a nozzle, and means for ejecting the liquid through the nozzle, a cylinder secured to the upper end of the barrel and having a threaded portion projecting beyond the barrel, a T having an internally threaded neck screwing on to the cylinder and internally threaded end portions and provided with a vent intermediate of its ends, and handles screwing into the said end portions of the T.

CLAYTON O. BLANDIN.
WILLIAM T. DAVIS.
WILLIAM A. REYNOLDS.

Witnesses:
ALBERT J. SANDS,
C. W. CARVER.